Patented May 8, 1951

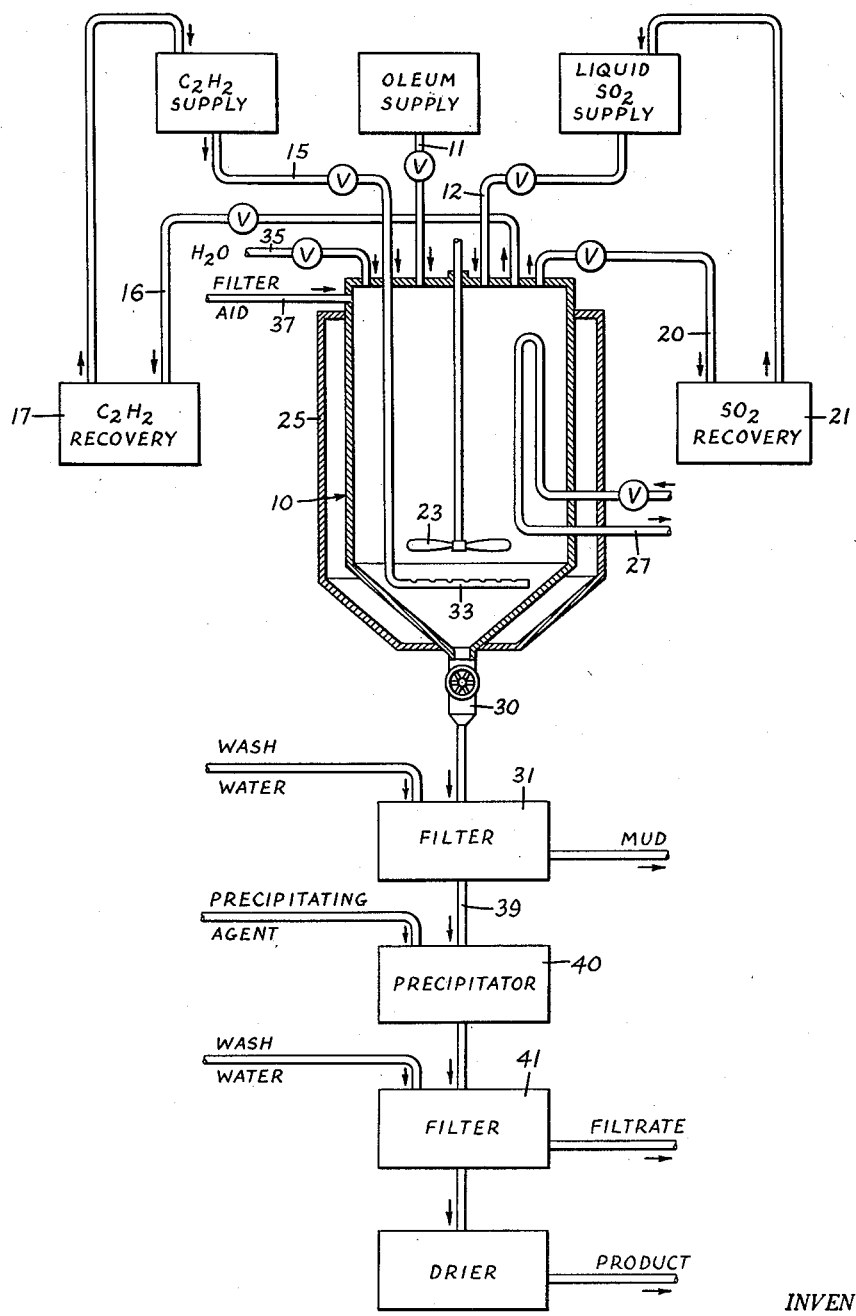

2,552,421

UNITED STATES PATENT OFFICE 2,552,421

MANUFACTURE OF ALDEHYDE SULFONIC ACID AND SALTS THEREOF

Everett E. Gilbert and Julian A. Otto, New York, N. Y., assignors to Allied Chemical & Dye Corporation, New York, N. Y., a corporation of New York Application December 29, 1948, Serial No. 68,024

6 Claims. (Cl. 260—513)

This invention relates to manufacture of acetaldehyde disulfonic acid and certain salts thereof.

The invention aims to provide procedures by practice of which it is possible to make, from acetylene and sulfur trioxide, acetaldehyde disulfonic acid and its salts in high yields.

The process of the invention comprises first, reaction of acetylene ($C_2H_2$) and sulfur trioxide ($SO_3$) to form an intermediate reaction product of these materials; and second, subjecting such reaction product to hydrolysis to form an acetaldehyde disulfonic acid liquor. Separate from or in conjunction with the foregoing steps, the invention includes a particular treatment of an acetaldehyde sulfinoc acid liquor to recover acetaldehyde disulfonic acid as a salt thereof.

The nature of the invention and the advantages thereof may be understood from the following description taken in connection with the accompanying drawing showing, partly in section and partly diagrammatically, apparatus which may be employed to carry out the procedure of the present improvements.

Referring to the drawing, the first and second phases of the process may be effected in a closed, e. g. glass-lined, reactor 10 provided with inlets 11 for oleum or liquid sulfur trioxide and an inlet 12 for liquid sulfur dioxide; an inlet 15 for acetylene gas, an outlet 16 for unabsorbed acetylene leading to an acetylene recovery unit 17; an outlet 20 for gaseous sulfur dioxide connected to a sulfur dioxide recovery unit and liquefier 21; an agitator 23; refrigerating equipment indicated generally by the jacket 25 to maintain hereinafter stated low temperatures during the course of the first part of the reaction; heating coils 27 for evaporating off sulfur dioxide on completion of one portion of the reaction; a reactor outlet 30 by means of which material may be transferred from reactor 10 to filter 31; it being understood that the gas and liquid inlets and outlets and the heating coils are each provided with suitable control valves.

In accordance with the invention, it has been found that by reacting acetylene with the sulfur trioxide constituent of a liquid mixture containing sulfur trioxide, liquid sulfur dioxide and not more than about 10% by weight of equivalent $H_2O$ based on the weight of the total sulfur trioxide initially present, or by reacting acetylene with the sulfur trioxide constituent of a liquid anhydrous mixture containing sulfur trioxide and liquid sulfur dioxide, and subjecting the resulting intermediate reaction product to hydrolysis, there are formed liquors containing acetaldehyde disulfonic acid in remarkably high yields. We find that the high yields of the acid and salts of the acid, demonstrated herein, are dependent to a large extent upon the manner in which the reaction of acetylene and sulfur trioxide is carried out. In this connection, the invention also includes discovery of a certain solvent and/or reaction medium, namely anhydrous liquid sulfur dioxide, the use of which makes possible the carrying out of the processes of these improvements in such a way as to obtain the high yields of the products described.

In practice of the invention, there is first formed an initial liquid mixture containing sulfur trioxide and liquid sulfur dioxide. In making up this starting mixture, the sulfur trioxide constituent may be supplied as anhydrous 100% sulfur trioxide, in which situation the liquid mixture is anhydrous and consists of 100% sulfur trioxide and liquid sulfur dioxide, the term "anhydrous" here being used to exclude from the liquid mixture water in all forms and the presence of materials which may contain water of constitution. In the more desirable embodiments of the invention, the sulfur trioxide constituent of the initial liquid mixture is furnished as the free and combined $SO_3$ of oleum of certain minimum free $SO_3$ strength. We have found that in order to obtain the high yields of the invention products, namely acetaldehyde disulfonic acid and certain salts thereof, the initial liquid mixture should be made up of liquid sulfur dioxide and oleum of strength containing not less than about 45% free $SO_3$, i. e. 45% oleum. The liquid mixture thus formed contains sulfur trioxide, liquid sulfur dioxide, and not more than about 10% by weight of equivalet $H_2O$ based on the weight of the total (combined and free) sulfur trioxide present. It is preferred to include in the starting liquid mixture at least some equivalent $H_2O$ which is usually in the form of water of constitution of $H_2SO_4$, i. e., in the better embodiments it is desirable to employ, as the source of $SO_3$, oleums of strengths of about 45% and up as distinguished from anhydrous 100% $SO_3$. Hence in the starting liquor make-up operation, preferably we utilize oleum of strength not less than about 45% and not more than about 95% free $SO_3$, in which circumstance the initial liquid mixtures contain not more than about 10% and not less than about 1% by weight of equivalent $H_2O$ based on the weight of the total sulfur trioxide present. We find best yields are obtained when the $SO_3$ constituent is supplied as oleum of not less than about 60% free $SO_3$ strength, i. e. oleum containing not more than about 7.5% by weight of equivalent $H_2O$ based on the weight of the total sulfur trioxide present. Thus, the most desirable liquid starting mixtures contain liquid sulfur dioxide, sulfur trioxide, and not more than about 7.5% and at least some but preferably not less than about 1% by weight of equivalent $H_2O$ based on the weight of the total sulfur trioxide present.

While the invention as detailed herein is described mostly in connection with the use of oleums in making up the initial sulfur trioxide-sulfur dioxide liquid mixture, it will be understood that the same principles apply when using 100% sulfur trioxide as source of $SO_3$ constituent.

In a representative procedure for practice of a preferred embodiment of the invention, there is first formed in the reactor 10 a liquid mixture preferably consisting of liquid sulfur dioxide and oleum of the particular strength to be used. While the amount of sulfur dioxide in the liquid mixture initially formed in the reaction vessel may be within any limits suitable to maintain the mass in the reactor in an agitatable condition throughout the reaction, we find that the preliminary liquid mixture should contain usually not less than 40% by weight of liquid sulfur dioxide, and in the better forms of practice, it is preferred to increase the sulfur dioxide content to not less than 50% by weight and more. With these features in mind, anhydrous liquid sulfur dioxide and oleum are run into the reactor in appropriate amounts thru their respective inlets 11 and 12 the valves of which are thereafter closed, it being understood that at this time the valves on the acetylene inlet 15 and gaseous sulfur dioxide outlet 20 are closed.

Reactions involved in the first stage of the process of the invention are carried out at temperatures appreciably below the boiling point of liquid sulfur dioxide at the particular pressure of operation, i. e. appreciably below minus 10° C. when working at substantially atmospheric pressure. Thus, on charging the oleum and liquid sulfur dioxide into the reactor, the refrigerating apparatus is operated to create in the mixture in the reactor sufficiently low temperatures. Since subsequent reaction of acetylene and sulfur trioxide generates some heat, before introduction of any acetylene into the reactor, it is more satisfactory to refrigerate the sulfur trioxide-sulfur dioxide mixture to temperatures of say minus 35° C. to minus 50° C. Agitator 23 is then started, and introduction of acetylene commenced, best results being obtained when the acetylene is bubbled into the bottom of the liquor mass in the reactor by means of a suitable distributor 33. All during the subsequent addition of acetylene and throughout the course of the reaction effected thereby, the mass in the reactor is maintained, assuming approximate atmospheric pressure, below about minus 15° C., and preferably in the range of minus 20–30° C. Reaction temperatures as high as minus 10° C. and more may be used if provisions are made to take care of increase of vapor pressure of the sulfur dioxide at such higher temperatures.

Two factors of importance in practice of the initial phase of the process are the presence in the reactor of liquid sulfur dioxide and the presence in the reactor of not more than about 10% by weight of equivalent $H_2O$ based on the weight of the total sulfur trioxide initially present. Under these conditions, the intermediate product of the first stage of the invention is apparently formed by reaction of one molecular proportion of acetylene with four molecular proportions of $SO_3$, and reaction proceeds rapidly without difficulty. On initiation of introduction of acetylene, with good refrigeration and agitation, absorption of acetylene is nearly complete and continues so during the greater part of a run. Rate of charging of acetylene appears to be dependent only upon efficiency of refrigeration. Shortly after feed of acetylene into the liquid mixture has commenced, the mass in the reactor takes on a light brownish hue the intensity of which usually increases as the reaction proceeds to completion. Also, the reaction mass becomes progressively less fluid and acquires substantial viscosity as the reaction end point is approached. When it appears at the acetylene gas outlet of the reactor that the amount of acetylene discharged about equals the acetylene input, the end point of reaction is reached, and the supply of acetylene gas is shut off, and the valve in pipe connection 16 between the reactor and the acetylene recovery system 17 is closed, the valve in the pipe connection 20 between the reactor and the $SO_2$ recovery and liquefying apparatus 21 is opened, and temperature of the mass in the reactor is adjusted to about minus 10° C.

Separation of the sulfur dioxide solvent and hydrolysis of the intermediate product formed by the $C_2H_2$—$SO_3$ reaction are also carried out in reactor 10. Removal of the sulfur dioxide and hydrolysis may be carried out in separate steps if desired, but ordinarily such procedure affords no operating advantage. Hydrolysis is effected by introducing water into the reactor thru pipe 35. Since a substantial amount of heat is liberated during hydrolysis, it is preferred to hydrolyze immediately after completion of introduction of acetylene, thus utilizing such heat to distill off most of the $SO_2$. To avoid too rapid evolution of $SO_2$ gas and resultant undesirable frothing, addition of water from pipe 35 should be very gradual especially at the outset of hydrolysis, the actual rate of introduction being dependent upon the particular operating conditions such as the amount of liquid and volume of gas space in the reactor. Best results are obtained when rate of introduction of water and refrigeration are controlled so that during hydrolysis temperatures within the mass in the reactor are held at about minus 10° C., at which temperature hydrolysis and evolution of $SO_2$ proceeds smoothly. After most of the water needed for hydrolysis has been added, the mixture in the reactor begins to stratify into an upper layer of unremoved nearly colorless $SO_2$ and a dark brown lower layer of substantial viscosity. Thereafter water introduction and temperature rise may be gradually increased but at rates such as to avoid excessive foaming. After all the water required to effect the hydrolysis reaction has been introduced, refrigeration may be completely discontinued, and by suitable operation of heating coils 27, temperature of the mass in the reactor may be permitted to rise as high as 60–70° C. and held thereabouts for a time interval sufficient to remove practically all of the remaining $SO_2$.

Substantially complete hydrolysis of the $C_2H_2$—$SO_3$ reaction product requires addition to the reactor of about three molecular proportions of water. Using the reactants in approximate molecular proportions of one $C_2H_2$, four $SO_3$, and three $H_2O$, at the end of hydrolysis there is formed a solution comprising acetaldehyde disufonic acid $CHOCH(SO_3H)_2$, and $H_2SO_4$ in respective molecular proportions of about one to two. The liquor thus obtained may be discharged through reactor outlet 30, and may be considered as a product of the invention and be utilized as an intermediate in other chemical operations, or further processed by known procedures to recover acetaldehyde disulfonic acid as such or as salts thereof.

In accordance with this invention, however, it is preferred to add to the hydrolyzed mass in the reactor considerably more water than theoretically needed to effect hydrolysis, such additional water being used to dilute the mass in order to facilitate the acetaldehyde sulfonic acid recoveries hereafter described. By the procedures of these improvements, it is preferred to incorporate all of the water employed in the process just after completion of hydrolysis and while the hydrolyzed mass is in the reactor. Following introduction of such additional water, it is ordinarily desirable to filter the hydrolyzed and diluted liquor to remove impurities such as relatively small amounts of tarry material, and for this purpose it is desirable to utilize a suitable filter aid. Reactor 10 may be provided with an inlet connection 37 through which a clarifying agent such as activated charcoal may be introduced and mixed with the liquor. Following thorough dispersal of filter aid in the liquor, agitation which has been maintained throughout the process thus far described is stopped, the valve of outlet 30 is opened, the liquor is run through filter 31, the filtrate of which, together with any washings, is fed through line 39 into tank 40.

In practice, it is preferred to recover the acetaldehyde disulfonic acid as an alkaline earth or an alkali metal salt thereof. The acetaldehyde disulfonic acid may be recovered as the barium or calcium acetaldehyde disulfonate dihydrate by treating the clarified aqueous acetaldehyde disulfonic acid-sulfuric acid liquor in tank 40 with a suitable barium or calcium base or salt such as the carbonate or hydroxide. For example, to recover the acetaldehyde disulfonic acid as barium acetaldehyde disulfonate dihydrate, the liquor in tank 40 may be treated with $BaCO_3$ in quantity sufficient to neutralize all of the $H_2SO_4$ and react with all of the acetaldehyde disulfonic acid. When the liquor in tank 40 has been diluted (in reactor 10) with an amount of water such that the $H_2SO_4$ content of the liquor in tank 40 contains preferably not more than about 10% by weight of $H_2SO_4$, and when temperatures during addition of barium carbonate are held just above about 50° C., sulfate of the sulfuric acid is precipitated out as barium sulfate while the barium acetaldehyde disulfonate dihydrate remains in solution. The resulting liquor may be filtered while hot, e. g. above 50° C., to separate out the barium sulfate. The filtrate may be evaporated to any suitable concentration, and thereafter cooled to room temperature or below to crystallize the barium salt which may be filtered out of the liquor, suitably dried and ultimately recovered as barium acetaldehyde disulfonate.$2H_2O$ Substantially the same procedure may be followed if it is desired to recover the acetaldehyde disulfonic acid as the calcium salt. In this instance, as in the case of use of the barium precipitant, addition of water to reactor 10 is controlled so as to provide in tank 40 a liquor sufficiently dilute so as to facilitate, on addition of for example calcium carbonate or calcium hydroxide, precipitation of calcium sulfate and retention of the calcium acetaldehyde disulfonate dihydrate in solution. When recovering the acetaldehyde disulfonic acid as the calcium salt, the clarified aqueous acetaldehyde disulfonic acid-sulfuric acid liquor in tank 40 should contain preferably not more than about 10% by weight of $H_2SO_4$, and the amount of calcium precipitant used should be enough to react with all of the $H_2SO_4$ and acetaldehyde disulfonic acid.

One phase of the invention comprises discoveries making possible the recovery of acetaldehyde disulfonic acid as a potassium salt by procedure affording substantial commercial operating advantages. In accordance with these improvements, such recovery is effected by treating the clarified liquor in tank 40 with a potassium salt such as the chloride, carbonate, bicarbonate, sulfate, sulfite, or bisulfite of potassium. Our investigations show that if water dilution in reactor 10 is effected to such an extent that the clarified aqueous acetaldehyde disulfonic acid-sulfuric acid liquor in tank 40 has a sulfuric acid content not in excess of about 40% by weight $H_2SO_4$, a potassium salt precipitant may be used in quantities which need not be much more than those theoretically required to react with the acetaldehyde disulfonic acid to form the potassium salt thereof. We find that if the just indicated dilution conditions in tank 40 are created, the potassium precipitant reacts with the acetaldehyde disulfonic acid, in preference to reacting with the $H_2SO_4$, to precipitate the disulfonic acid as the potassium salt while by-products formed by the precipitation reaction are soluble and remain in solution or are evolved as a gas. In best practice, particularly when using the preferred precipitant, water dilution in reactor 10 is effected to such an extent that the clarified aqueous liquor in tank 40 has a sulfuric acid content not in excess of about 35%, in order to facilitate recovery of final salt product of high purity. It is advisable to introduce into tank 40 an amount of potassium salt at least in excess of that theoretically needed to react with the acetaldehyde disulfonic acid to form the potassium salt thereof, but we find such excess need not be more than about 10–15%, and preferably is not more than 25% by weight, above stoichiometrical requirements.

The preferred precipitant of the invention is potassium chloride of any commercially available form. A quantity of this material equivalent to about 10% in excess of that theoretically required to react with the acetaldehyde disulfonic acid present is introduced into tank 40, the liquor therein being normally at temperatures of 20° to 30° C. We find that the addition all at once to tank 40 of all of the potassium chloride needed causes a temperature rise of not more than 5–10° C., and accordingly it is unnecessary to maintain any extraneous cooling during addition of the potassium chloride. Immediately on introduction of the potassium chloride, precipitation of the potassium salt of acetaldehyde disulfonic acid commences, the reaction taking place being represented by the following equation:

$CHOCH(SO_3H)_2 + 2KCl + H_2O \rightarrow$
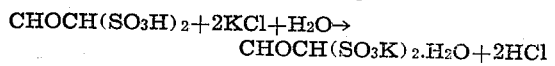

On completion of addition of potassium chloride, if desired, the mass may be cooled to 15° to 20° C. to further facilitate precipitation. The mass is then run into filter 41 and the filtrate comprising water, sulfuric acid, and hydrochloric acid may be turned to waste. After water washing, the filter cake comprising potassium acetaldehyde disulfonate. $H_2O$ may be dried by any standard method of drying, such as air drying or oven drying at temperature up to 100–105° C.

The foregoing procedure, substantially as described, may be followed when employing other potassium salts indicated as the precipitant. For example, in the case of potassium carbonate, the $CO_2$ formed by reaction of the potassium carbonate and the acetaldehyde disulfonic acid is evolved as a gas, and when using potassium sulfate as a precipitant, the $H_2SO_4$ formed by reaction between the potassium sulfate and acetaldehyde disulfonic acid increases the $H_2SO_4$ concentration of the motor liquor but does not, provided the initial $H_2SO_4$ concentration of the liquor in tank 40 does not exceed about 40% by weight as above indicated, interfere with precipitation of the potassium acetaldehyde disulfonate.

The potassium salts make possible the recovery of acetaldehyde disulfonic acid as a potassium salt by the use of only a relatively small excess of the base or salt over that theoretically needed to react with the acetaldehyde disulfonic acid, thus effecting a substantial economy as to quantity of precipitant consumed. The by-products of acetaldehyde disulfonic acid are either evolved as gas or are soluble in the mother liquor, hence only one filtration step, e. g. filter 41, is needed to accomplish final recovery of the potassium acetaldehyde disulfonate. Since the addition of the potassium salts to the acetaldehyde disulfonic acid liquor in tank 40 does not cause any practical temperature rise, the potassium salts afford the further advantages of permitting rapid addition to tank 40 of all of the potassium precipitant needed and avoiding use of extraneous cooling to keep temperatures down. The precipitants disclosed may be added to the liquor to be treated in any convenient manner, either as solids or in water solution or suspension.

Following are examples of practice of the invention. All parts indicated are by weight. All yields are given on the basis of the total $SO_3$ (as $SO_3$ or $H_2SO_4$) present in the initial liquid mixture made up of oleum plus liquid $SO_2$ or of liquid 100% $SO_3$ plus liquid $SO_2$. In connection with the yield values given, it should be noted that about half of the total incoming $SO_3$ (as $SO_3$ or $H_2SO_4$) is inherently and unavoidably lost as the $SO_3$ content of the $H_2SO_4$ which splits out on hydrolysis. Hence, it will be understood that on the basis of total $SO_3$ (as $SO_3$ or $H_2SO_4$) used in the process, the maximum yield possible is of the order of 50% by weight plus or minus.

Example 1

In a reactor, there was first formed a liquid mixture consisting of about 200 parts of anhydrous liquid $SO_2$ and about 96 parts of 95% oleum, the mixture thus containing about 1% by weight of equivalent $H_2O$ on the basis of the total $SO_3$ present. Temperature of the liquid mixture in the reactor was reduced to minus 25–30° C. The mass was agitated, and a stream of acetylene was introduced and at a rate adjusted so that nearly all of the acetylene was absorbed. All during introduction of acetylene, temperature of the charge was held at about minus 15–20° C. After about 40 minutes, absorption of acetylene was no longer apparent, a heavy sticky precipitate formed, and input of acetylene and refrigeration were stopped. The amount of acetylene introduced corresponded with that required for an acetylene to $SO_3$ weight ratio of about 1 to 4. To the mixture were added slowly about 75 parts of water and the $SO_2$ was allowed to evaporate. After adding another 150 parts of water, the mixture was heated to about 60° C. on a steam bath to substantially completely remove residual $SO_2$. The resulting liquor, containing acetaldehyde disulfonic acid and sulfuric acid, was treated with 15 parts of activated carbon (Darco) and filtered. The liquor at this point contained about 18% by weight of $H_2SO_4$. About 47 parts of KCl in about 125 parts of water were added. This amount of KCl was about 6% by weight in excess of that theoretically needed to react with all the acetaldehyde disulfonic acid. A heavy precipitate formed. After cooling to 10° C., the precipitated product was collected on a filter, washed with about 75 parts of water and dried. 88 parts of potassium acetaldehyde disulfonate monohydrate product were obtained, and yield was about 50%. Addition of more KCl to the filtrate gave no further precipitate.

Example 2

There was formed in a reactor, a liquid mixture consisting of about 250 parts of anhydrous liquid $SO_2$ and about 132 parts of 60% oleum, the mixture thus containing about 7.5% by weight of equivalent $H_2O$ on the basis of the total $SO_3$ present. Reaction of the liquid mixture with acetylene was effected substantially as in Example 1. To the reacted mixture were added slowly about 75 parts of water and the $SO_2$ was allowed to evaporate. After adding about another 100 parts of water, the mixture was heated to about 60° C. on a steam bath to substantially completely remove residual $SO_2$. The resulting liquor, containing acetaldehyde disulfonic acid and sulfuric acid, was treated with 15 parts of activated carbon (Darco) and filtered. The liquor (about 332 parts) at this point contained about 20% by weight of $H_2SO_4$. About 63 parts of KCl in about 175 parts of water were added. A heavy precipitate formed. After cooling to 10° C., the precipitated product was collected on a filter, washed with about 100 parts of ice water and dried. 121 parts of product were obtained, and yield was about 52–53%.

Example 3

The initial liquid mixture consisted of about 250 parts of anhydrous liquid $SO_2$ and about 186 parts of 45% oleum, the mixture thus containing about 10% by weight of equivalent $H_2O$ on the basis of the total $SO_3$ present. Reaction, $SO_2$ removal, water dilution, activated carbon treatment and filtration were substantially the same as in Example 1. The filtered liquor contained about 20% by weight of $H_2SO_4$. About 47 parts of KCl in about 125 parts of water were added, and a heavy precipitate formed. After cooling to 10° C., the precipitated product was collected on a filter, water washed and dried as in Example 1, and 132 parts of product were obtained. Yield was about 42%.

Example 4

While agitating, acetylene was slowly passed into an anhydrous mixture initially consisting of 49 parts of liquid sulfur trioxide and 55.5 parts of liquid sulfur dioxide maintained in the temperature range of minus 20–25° C. during addition of the acetylene. At first there was complete absorption of acetylene and the solution gradually darkened. After 50 min., the absorption of acetylene slowed down, and after 1 hr. and 20 min., no further absorption was apparent. At the end of the reaction, the mixture was brownish and syrupy. Refrigeration was diminished, and temperature was raised to distill off the sulfur dioxide. To this intermediate reaction product of $SO_3$ and $C_2H_2$, 400 parts of ice water were added slowly, forming a liquor containing about 5% by weight of $H_2SO_4$. The resulting mixture, containing acetaldehyde disulfonic acid and sulfuric acid, was treated with barium carbonate in amount needed to neutralize all of the acetaldehyde disulfonic acid and all of the $H_2SO_4$. The liquor was treated with filter aid at temperature of about 55° C., and filtered while hot to separate and precipitate barium sulfate. The filtrate evaporated to about 115 parts at reduced pressure of about 50–60 mm. of Hg. On cooling and filtration, 17 parts of product shown by analysis to be barium acetaldehyde disulfonate.$2H_2O$ were obtained.

*Example 5*

There was formed in a reactor an anhydrous mixture initially consisting of about 200 parts of liquid sulfur dioxide, and about 72 parts of liquid 100% sulfur trioxide. While agitating, the temperature of the mass in the reactor was held in the range of minus 20–30° C. during subsequent acetylene introduction which was continued until a precipitate started to form and absorption of acetylene dropped off substantially. Refrigeration was diminished. With continued agitation, about 50 parts of water were slowly added to the mixture to hydrolyze the acetylene-$SO_3$ reaction product, heat of reaction causing most of the $SO_2$ to evaporate. The resulting solution was then heated on a steam bath for about 30 min., treated with clarifying agent, filtered and the filter aid mud was washed with about 75 parts of cold water. To the combined filtrate and washings, containing about 15% by weight of $H_2SO_4$, there were added all at once, about 38 parts of KCl (C. P.) dissolved in about 110 parts of water. This amount of KCl was about 13% by weight in excess of that theoretically needed to react with the acetaldehyde disulfonic acid. There was only a slight but no practical rise in temperature. After cooling to about 10° C. to facilitate precipitation of the disulfonate salt, the precipitate was collected, washed three times with cold water and dried. There were obtained 64.3 parts of potassium acetaldehyde disulfonate monohydrate, yield being about 47–48%.

*Example 6*

About 549 parts of 100% liquid $SO_3$, and about 900 parts of liquid sulfur dioxide were introduced into a reactor. The temperature of the mass in the reactor was held in the range of minus 15–20° C. during subsequent introduction of acetylene which was added at a rate of about 2 cubic feet per hr. until a precipitate started to form and acetylene absorption decreased materially. Refrigeration was diminished. The resulting acetylene-$SO_3$ reaction product was hydrolyzed by the slow addition of about 400 parts of water, most of the $SO_2$ being evaporated by the heat of reaction. After further diluting with about 400 parts of water, heating on a steam bath for about 30 min. to 60–70° C., treating the mass with activated charcoal, and filtering, the combined filtrate and washings was cooled to about room temperature. Such liquor contained about 10% by weight of $H_2SO_4$. About 300 parts of muriate of potash, (chemical grade, 95% KCl) dissolved in 1000 parts of water were added all at once and the mixture cooled to about 14° C. The precipitate was filtered out, washed with about 300 parts of ice water, and dried. 498 parts of potassium acetaldehyde disulfonate monohydrate were recovered, yield being about 48.7%.

We claim:

1. In the process for making a potassium salt of acetaldehyde disulfonic acid which involves formation of a solution of said acid, the improved method for isolating said salt which includes forming from said solution an aqueous liquor comprising acetaldehyde disulfonic acid and sulfuric acid in amount not more than about 40% $H_2SO_4$ by weight of said liquor, treating said liquor with a water soluble potassium salt in quantity to effect precipitation of substantially all of the acetaldehyde disulfonic acid as the potassium salt thereof, and separating solid potassium acetaldehyde disulfonate from said liquor.

2. In the process for making a potassium salt of acetaldehyde disulfonic acid which involves formation of an aqueous sulfuric acid solution of said acid, the improved method for isolating said salt which includes forming from said solution an aqueous liquor comprising acetaldehyde disulfonic acid and sulfuric acid in amount not more than about 35% $H_2SO_4$ by weight of said liquor, treating said liquor with a water soluble potassium salt in quantity in excess of that theoretically required to react with the acetaldehyde disulfonic acid, said excess being not more than 25% by weight, to thereby effect precipitation of substantially all of the acetaldehyde disulfonic acid as the potassium salt thereof, and separating solid potassium acetaldehyde disulfonate from said liquor.

3. In the process for making a potassium salt of acetaldehyde disulfonic acid which involves formation of an aqueous sulfuric acid solution of said acid, the improved method for isolating said salt which includes forming from said solution an aqueous liquor comprising acetaldehyde disulfonic acid and sulfuric acid in amount not more than about 35% $H_2SO_4$ by weight of said liquor, treating said liquor with potassium chloride in quantity about 10% in excess of that theoretically required to react with the acetaldehyde disulfonic acid, to thereby effect precipitation of substantially all of the acetaldehyde disulfonic acid as the potassium salt thereof, and separating solid potassium acetaldehyde disulfonate from said liquor.

4. The process for making a potassium salt of acetaldehyde disulfonic acid which comprises reacting acetylene with sulfur trioxide constituent of a mixture containing sulfur trioxide, liquid sulfur dioxide, and not more than about 10% by weight of equivalent $H_2O$ based on the weight of the total sulfur trioxide initially present, hydrolyzing the resulting reaction product, separating sulfur dioxide from the hydrolyzed mass, and isolating said salt by forming from the residual hydrolyzed mass an aqueous liquor comprising acetaldehyde disulfonic acid and sulfuric acid in amount not more than about 40% by weight of said liquor, treating said liquor with a water soluble potassium salt in quantity to effect precipitation of acetaldehyde disulfonic acid as the said potassium salt thereof, and separating solid potassium acetaldehyde disulfonate from said liquor.

5. The process for making a potassium salt of acetaldehyde disulfonic acid which comprises forming a liquid mixture containing sulfur trioxide and liquid sulfur dioxide, said mixture containing not less than 40% by weight of liquid sulfur dioxide and not more than about 10% by weight of equivalent $H_2O$ based on the weight of the total sulfur trioxide initially present, reacting sulfur trioxide of said mixture with acetylene while maintaining temperature below the boiling point of the sulfur dioxide under the conditions of operation, hydrolyzing the resulting reaction product, separating sulfur dioxide from the hydrolyzed mass, and isolating said salt by forming from the residual hydrolyzed mass an aqueous liquor comprising acetaldehyde disulfonic acid and sulfuric acid in amount not more than about 40% $H_2SO_4$ by weight of the liquor, treating said liquor with a water soluble potassium salt in quantity in excess of that theoretically required to react with the acetaldehyde disulfonic acid, said excess being not more than 25% by weight, to thereby effect precipitation of substantially all the acetaldehyde disulfonic acid as the potassium salt thereof, and separating solid potassium acetaldehyde disulfonate from said liquor.

6. The process for making a potassium salt of acetaldehyde disulfonic acid which comprises forming a liquid mixture containing sulfur trioxide and liquid sulfur dioxide, said mixture containing not less than 50% by weight of liquid sulfur dioxide and not more than about 7.5% by weight of equivalent $H_2O$ based on the weight of the total sulfur trioxide initially present, passing acetylene into said mixture while maintaining temperature below minus 15° C., continuing addition of acetylene until substantially no further absorption of acetylene by said mixture takes place, hydrolyzing the resulting reaction product, separating sulfur dioxide from the hydrolyzed mass, and isolating said salt by forming from the residual hydrolyzed mass an aqueous liquor comprising acetaldehyde disulfonic acid and sulfuric acid in amount not more than about 35% $H_2SO_4$ by weight of the liquor, treating said liquor with potassium chloride in quantity about 10% in excess of that theoretically required to react with the acetaldehyde disulfonic acid, to thereby effect precipitation of substantially all the acetaldehyde disulfonic acid as the potassium salt thereof, and separating solid potassium acetaldehyde disulfonate from said liquor.

EVERETT E. GILBERT.
JULIAN A. OTTO.

REFERENCES CITED

The following references are of record in the file of this patent:

UNITED STATES PATENTS

| Number | Name | Date |
| --- | --- | --- |
| 2,061,620 | Downing | Nov. 24, 1936 |
| 2,160,343 | Ross | May 30, 1939 |
| 2,285,390 | Brandt | June 9, 1942 |
| 2,290,167 | Datin | July 21, 1942 |
| 2,304,767 | Ross et al. | Dec. 8, 1942 |
| 2,316,670 | Bangs | Apr. 13, 1943 |
| 2,361,367 | Davis | Oct. 31, 1944 |
| 2,383,752 | Sveda | Aug. 28, 1945 |

FOREIGN PATENTS

| Number | Country | Date |
| --- | --- | --- |
| 106,501 | Germany | Aug. 10, 1898 |
| 632,610 | Germany | June 18, 1936 |

OTHER REFERENCES

Unit Processes in Organic Synthesis, page 285.